(No Model.) 2 Sheets—Sheet 1.

G. J. MEYER.
MALTING APPARATUS.

No. 504,478. Patented Sept. 5, 1893.

Witnesses:
Emil Neuhart.
Chas. F. Burkhardt.

Geo. J. Meyer  Inventor
By Wilhelm Bonner
Attorneys.

(No Model.) 2 Sheets—Sheet 2.
G. J. MEYER.
MALTING APPARATUS.
No. 504,478. Patented Sept. 5, 1893.
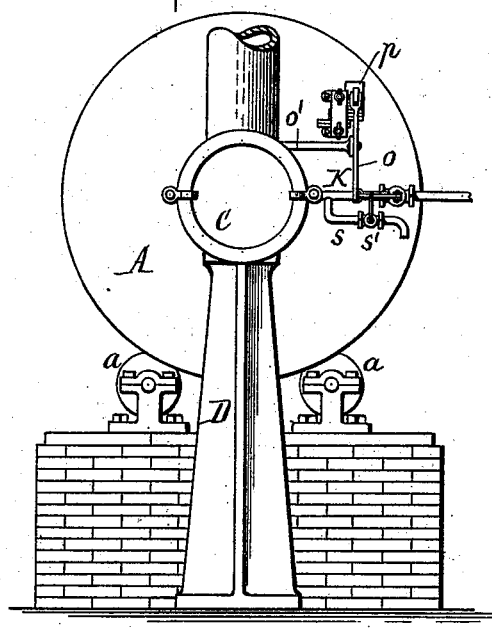
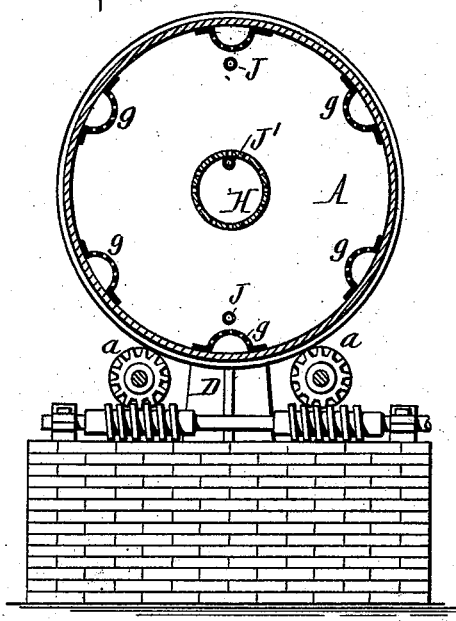
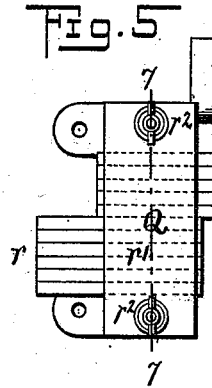
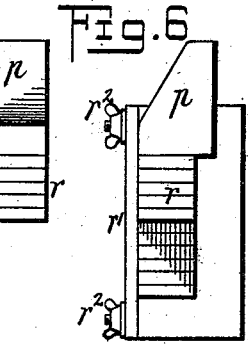
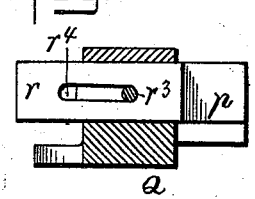
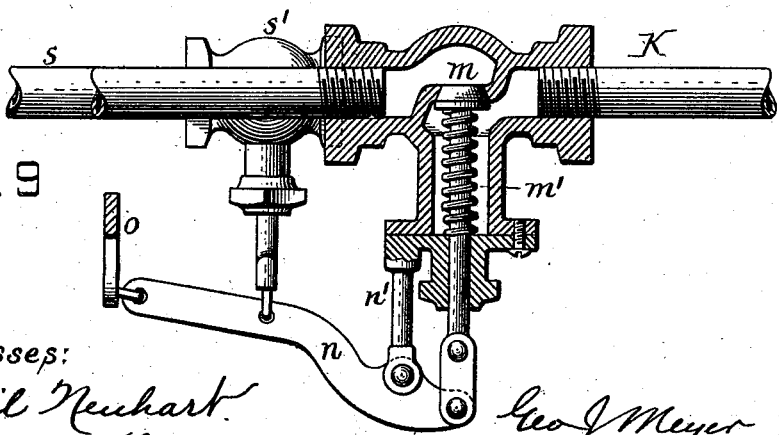
Witnesses:
Emil Neuhart
Chas. F. Burkhardt
Geo. J. Meyer Inventor.
By Wilhelm Bonner
Attorneys.

UNITED STATES PATENT OFFICE.

GEORGE J. MEYER, OF BUFFALO, NEW YORK.

MALTING APPARATUS.

SPECIFICATION forming part of Letters Patent No. 504,478, dated September 5, 1893.

Application filed June 22, 1893. Serial No. 478,430. (No model.)

*To all whom it may concern:*

Be it known that I, GEORGE J. MEYER, a citizen of the United States, residing at Buffalo, in the county of Erie and State of New York, have invented new and useful Improvements in Malting Apparatus, of which the following is a specification.

This invention relates to malting apparatus of that class which consists of a slowly revolving drum containing the grain or barley to be germinated and connected with an air propelling device, whereby a current of cool air is maintained through the drum, and the carbonic acid gas evolved by the growing or sprouting of the grain is removed. The air supplied to the drum has usually been moistened by passing it through a bed or layer of coke, above which was arranged a sprinkler, and the water from which intercepted the air and thus cooled and moistened the same. This system does not, however, moisten the air sufficiently, and in order to properly wet the grain, water has been introduced into the drum at suitable intervals by the use of an ordinary hose. This practice involves considerable labor, especially in extensive establishments where a large number of drums are employed, and it is further undesirable, because in opening the door of the drum, the grain adjacent to the door is exposed to a different temperature from the remaining portion thereof, which results in an uneven product.

The object of my invention is to provide such malting drums with simple sprinkling devices whereby water is automatically and uniformly delivered to the grain at proper intervals, thus saving time and labor and producing an even product.

Figure 1:
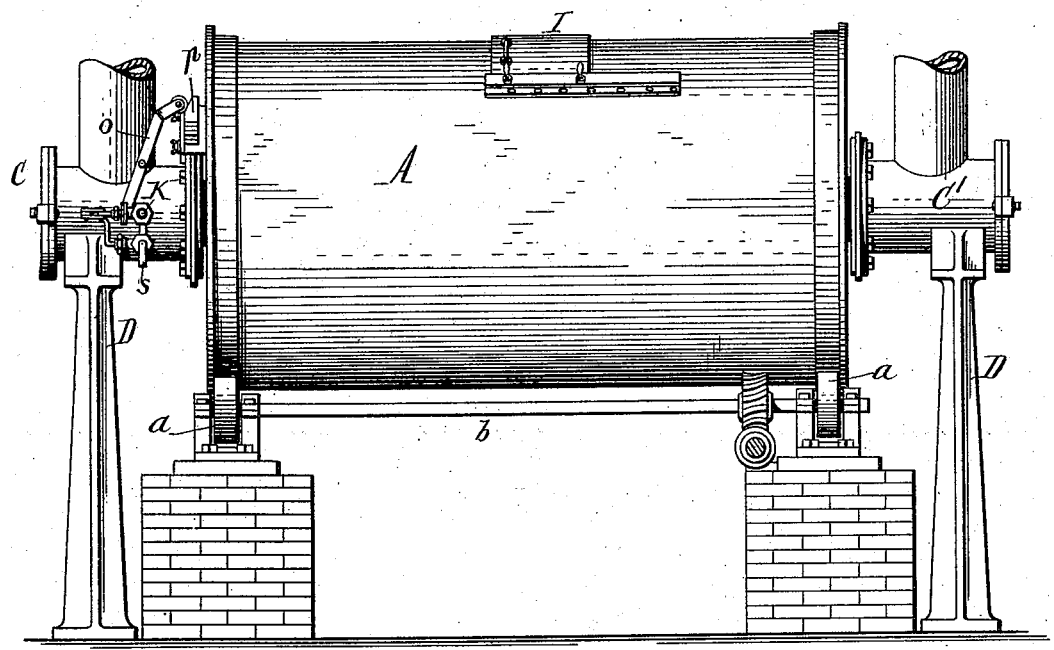
Figure 2:
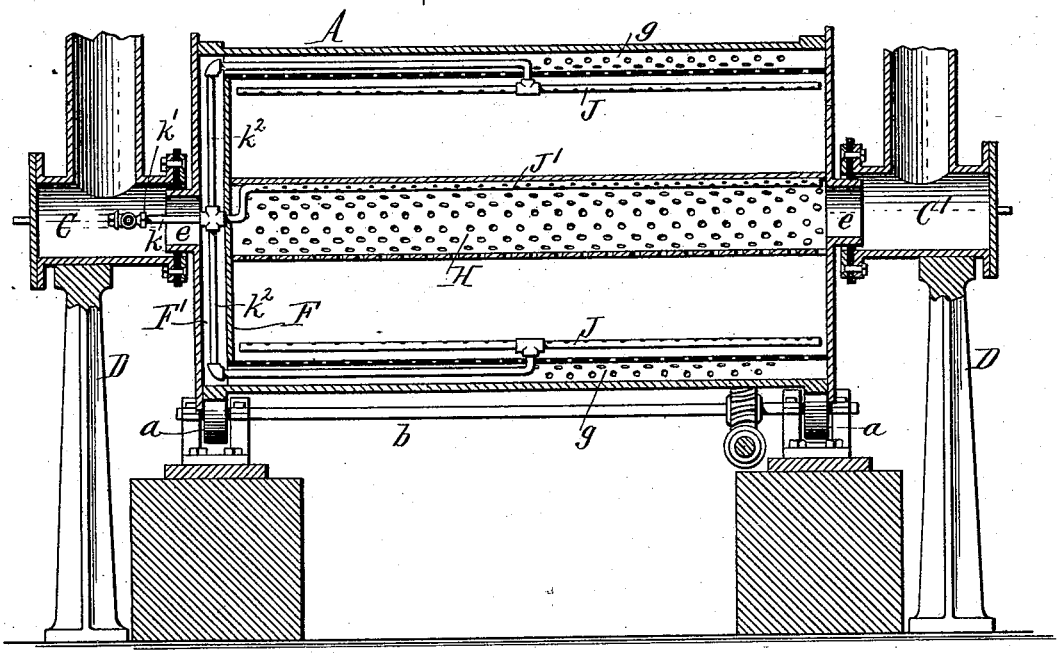

In the accompanying drawings consisting of two sheets:—Figure 1 is a side elevation of a malting device, provided with my improvement. Fig. 2 is a longitudinal sectional elevation of the same. Fig. 3 is a rear view thereof. Fig. 4 is a cross section of the drum. Fig. 5 is a face view of the extensible cam arranged on the drum. Fig. 6 is a side elevation thereof. Fig. 7 is a vertical section of the same in line, 7—7, Fig. 5. Fig. 8 is a cross section in line 8—8, Fig. 7. Fig. 9 is an enlarged sectional elevation of the valve which controls the passage of the water to the drum.

Like letters of reference refer to like parts in the several figures.

A represents the rotary malting drum or cylinder which is supported horizontally upon anti-friction rollers *a* in the usual manner. These rollers are secured to longitudinal shafts *b* journaled in bearings which rest upon beds of masonry, or other suitable supports. The drum may be slowly rotated by worm gearing connected with said roller shafts as shown, or by any other suitable means.

C is the stationary horizontal air inlet head or chamber arranged at one end of the drum, and C' the exhaust head or chamber arranged at the opposite end thereof, both of said chambers being supported on standards D. The malting drum is provided at opposite ends with the usual hollow trunnions *e*, which pass through openings in the adjacent inner heads of the air inlet and exhaust chambers, a close joint being formed between the parts by suitable packings, as shown.

F is the diaphragm arranged in the drum near its front head, and forming with the latter, the usual air space F', and *g* are the perforated longitudinal air conduits of the drum through which the air passes from the air space F' into the main portion of the drum.

H is the perforated exhaust tube which is arranged axially in the drum and through which the air passes from the surrounding portion of the drum into the exhaust head C'.

I is the sliding door which closes the peripheral opening in the drum through which the grain is introduced and removed.

J J represent sprinkler or water delivery pipes arranged within the drum, near the outer portion thereof, and J' is a similar pipe arranged within the exhaust tube, through which pipes water is supplied to the drum for moistening the grain in the same. These pipes extend nearly from end to end of the drum and are provided with numerous perforations through which the water is discharged in small jets or streams. The several delivery pipes are all connected with a rotary branch pipe *k* which is arranged axially in the inlet chamber C and the adjacent trunnion of the drum, and which is in turn connected with a stationary supply pipe K entering the inlet chamber, as shown in Fig. 3. This supply pipe extends to any available source. The axial branch pipe $k$ is rigidly connected at its inner end with the several sprinkler pipes, but its outer end is free to turn in a coupling or union $k'$ attached to the supply pipe within the inlet chamber, as shown in Fig. 2, so as to permit the sprinkler pipes to revolve with the drum. The central sprinkler pipe $J'$ is connected directly with the axial branch pipe $k$, while the other pipes $J$ are connected therewith by branch pipes $k^2$.

$m$ is a valve or stop cock arranged in the supply pipe $K$, outside of the inlet chamber C, for controlling the passage of the water into the drum. This valve is held in its closed position by a spring $m'$, as shown in Fig. 9.

$n$ is a horizontal actuating lever mounted upon a bracket $n'$ arranged on the casing of the stop cock $m$, or any other suitable support, and having its short arm connected with the stem of the valve.

$o$ is a trip lever arranged in an upright position above the actuating lever $n$, and pivoted to swing toward and from the adjacent end of the malting drum. This lever is fulcrumed upon an arm or bracket $o'$ secured to the inlet chamber C or other support. The lower arm of this trip lever is connected with the long arm of the actuating lever of the valve, while its upper arm projects into the path of a cam or incline $p$ arranged on the adjacent head of the malting drum, so that the cam trips said lever as the drum rotates. The upper end of the trip lever is preferably provided with an anti-friction roller, as shown. The cam $p$, in riding over the roller of the trip lever, swings the upper arm of the latter outward, away from the end of the drum, which causes its lower arm to move inward and swing the actuating lever $n$ in the proper direction to open the valve. The water now passes through the sprinkler pipes $J\ J'$ into the drum, whereby the grain is moistened. The water from the outer sprinkler pipes $J$ is delivered upon the outer portion of the body of grain, while the water discharged from the central pipe moistens the surrounding inner portion thereof. The water continues to flow into the malting drum until the advancing cam clears the trip lever, when the spring $m'$ of the valve, which has been previously compressed, reacts and closes the valve and at the same time returns the trip lever to its former position, ready to be again operated, during the next revolution of the drum. Water is in this manner delivered into the drum automatically once during every revolution of the drum, thus saving the time and labor heretofore required in performing this operation by hand. This automatic means of supply has the further advantage that it does not require the door of the drum to be opened during the process of germination, thus insuring a uniform growth of the grain and an even product. By arranging the sprinkler pipes near the wall of the drum, as well as near the center thereof, and extending the same from end to end of the drum, the body of grain is uniformly permeated by the water from its center to its periphery and caused to grow evenly in all portions of the drum. As the growth or sprouting of the grain advances, it is desirable to increase the supply of water thereto, and in order to permit this to be done, the cam $p$ is made extensible, so that it may be lengthened to hold the valve of the supply pipe open for a longer period. For this purpose, the cam is formed on or secured to one side of a bracket Q, so as to overhang the same, and on this bracket, below the cam, is arranged a number of superposed extension bars or platforms $r$, one or more of which are adapted to be shifted laterally under the cam, as shown in Figs. 5 and 6, so that their front edges form a continuation of its salient vertical portion, and thereby increase its length. These extension bars are fitted in an upright rectangular recess formed in the front side of the bracket Q, and are confined therein by a vertical clamping bar $r'$ which is secured to the front side of the bracket by screws having thumb nuts $r^2$, as shown in Figs. 5, 6, and 7. The entire withdrawal of these extension plates from the bracket is prevented by a vertical rod $r^3$ secured in the bracket and passing through longitudinal slots $r^4$ in the plates. In their normal positions the extension plates are retracted, so as to clear the space underneath the cam, as shown in the lower portion of Fig. 5. Upon loosening the thumb nuts $r^2$, any desired number of the extension plates may be pushed laterally under the cam for lengthening it, as shown in the upper portion of the last mentioned figure, and after shifting the plates, the thumb nuts are again tightened to clamp the plates in position. The front edges of the plates are arranged flush with the vertical portion of the cam face, so as to form with the latter a practically unbroken surface.

$s$ is a drain pipe which is connected with the supply pipe K between the valve $m$ and the inlet head C, and whereby any water lodging in the sprinkler pipes, after said valve is closed, is allowed to drain off.

$s'$ is a valve or stop cock arranged in this drain pipe whereby the water is prevented from escaping directly through the drain pipe when the supply valve $m$ is opened. The stem of the drain valve is connected with the long arm of the actuating lever $n$, as most clearly shown in Fig. 9. By this arrangement, the valve of the drain pipe is automatically closed when the valve of the supply pipe is opened, and automatically opened when the latter is closed.

I claim as my invention—

1. In a malting apparatus, the combination with a rotary malting drum and a sprinkler pipe arranged therein, of a water supply pipe arranged outside of the drum and connected with said sprinkler pipe, a cut off valve arranged in said supply pipe, and a trip device, whereby said valve is automatically operated by the rotation of the malting drum, substantially as set forth.

2. In a malting apparatus, the combination with a rotary malting drum and one or more sprinkler pipes arranged therein, of a stationary supply pipe arranged outside of the drum, connected with said sprinkler pipes and provided with a cut off valve, a cam arranged on the rotary drum, and a trip lever for operating said valve, arranged in the path of said cam, whereby the lever is actuated by the rotation of the drum, substantially as set forth.

3. In a malting apparatus, the combination with a rotary malting drum and one or more sprinkler pipes arranged therein, of a stationary supply pipe arranged outside of the drum, connected with said sprinkler pipes and provided with a cut off valve, an extensible cam arranged on the drum and composed of a bracket, an incline arranged on said bracket, and a series of flat superposed plates arranged in said bracket and capable of being shifted laterally under said incline, and a trip device for operating said valve, arranged in the path of said cam, substantially as set forth.

4. The combination with the rotary malting drum, and a sprinkler pipe arranged in the same, of a valve controlling the passage of the water through said pipe, a cam arranged on the drum for operating said valve, a bracket arranged adjacent to said cam, extension plates arranged in said bracket and adapted to be shifted in line with said cam for lengthening the same, and a clamping device for holding the extension plates in position, substantially as set forth.

5. The combination with the rotary malting drum and a sprinkler pipe arranged in the same, of a valve controlling the passage of the water through said pipe, a cam arranged on the drum for operating said valve, a recessed bracket arranged adjacent to said cam, slotted extension plates arranged in the recess of said bracket, a retaining rod passing through the slots of the extension plates, and a clamping bar for holding said plates in position, substantially as set forth.

6. The combination with the rotary malting drum and the sprinkler pipe arranged therein, of a supply pipe connected with the sprinkler pipe and having a valve, a drain pipe connected with said supply pipe and having a valve, an actuating lever, connected with both of said valves and arranged to open one of the same when the other is closed, a cam arranged on the rotary drum, and a trip lever connected with said actuating lever and operated by said cam, substantially as set forth.

Witness my hand this 8th day of June, 1893.

GEORGE J. MEYER.

Witnesses:
CARL F. GEYER,
F. C. GEYER.